United States Patent
Umemoto (10) Patent No.: US 6,553,965 B2
(45) Date of Patent: Apr. 29, 2003

(54) CONTROL SYSTEM FOR INTERNAL COMBUSTION ENGINE

(75) Inventor: Hideki Umemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,733

(22) Filed: Nov. 29, 2001

(65) Prior Publication Data

US 2002/0189588 A1 Dec. 19, 2002

(30) Foreign Application Priority Data

Jun. 18, 2001 (JP) ......................................... 2001-183000

(51) Int. Cl.$^7$ ................................................. F02P 5/04
(52) U.S. Cl. ............................. 123/406.6; 123/406.47; 123/406.63
(58) Field of Search ..................... 123/406.47, 406.59, 123/406.6, 406.62, 406.63

(56) References Cited

U.S. PATENT DOCUMENTS

| | | | | |
|---|---|---|---|---|
| 3,749,070 A | * | 7/1973 | Oishi et al. ............... | 123/406.47 |
| 3,757,755 A | * | 9/1973 | Carner ..................... | 123/406.59 |
| 3,874,351 A | * | 4/1975 | Adler et al. ............... | 123/406.6 |
| 4,363,304 A | * | 12/1982 | Fritz et al. ................ | 123/406.47 |
| 4,718,381 A | * | 1/1988 | McDougal et al. ....... | 123/406.59 |
| 4,959,996 A | * | 10/1990 | Akasu ..................... | 123/406.6 |
| 5,419,295 A | * | 5/1995 | Andersson ............... | 123/406.59 |
| 5,467,752 A | * | 11/1995 | Murao et al. ............. | 123/406.6 |
| 6,012,427 A | * | 1/2000 | Hoy et al. ................ | 123/406.6 |

FOREIGN PATENT DOCUMENTS

JP     1-313673     12/1989     ............ F02P/5/155

* cited by examiner

*Primary Examiner*—Willis R. Wolfe
*Assistant Examiner*—Douglas A. Salser
(74) *Attorney, Agent, or Firm*—Sughrue Mion, PLLC (57) ABSTRACT

A control system for an internal combustion engine is provided which is capable of controlling ignition timing, fuel injection timing and a fuel injection amount in a stable manner at any time even in an engine, or in an operating range or in an operating condition thereof, in which there are great variations in the number of revolutions per minute of the engine. The control system includes a reference signal generator (3) for generating a reference signal representative of a reference position of the rotation of the engine, a fixed angle signal generator (4) for generating a fixed angle signal which has a resolution higher than that of the reference signal and which is representative of a rotational position of the engine, and an internal combustion engine control unit (1a) with an arithmetic processing section (2) operable to receive the reference signal and the fixed angle signal and control ignition timing and fuel injection timing based on a count value of the fixed angle signal with the reference signal taken as a reference, the internal combustion engine control unit being also operable to control a fuel injection amount by a time measurement.

4 Claims, 13 Drawing Sheets

IRREGULAR INTERVALS

CONTROL SYSTEM FOR INTERNAL COMBUSTION ENGINE

This application is based on Application No. 2001-183000, filed in Japan on Jun. 18, 2001, the contents of which are hereby incorporated by reference.

BACKGROUND OF THE INVENTION

1. Field of the Invention

The present invention relates to a control system for an internal combustion engine, and in particular to a technique for controlling ignition timing, fuel injection timing and an amount of fuel injection.

2. Description of the Related Art

Major control functions of a control system for an internal combustion engine include ignition timing control for ignition coils, and fuel injection timing control and fuel injection amount control for fuel injectors. Here, note that for timing control of ignition timing and fuel injection timing, there is generally employed a method (cycle prediction method) in which a current cycle or period between reference signals representative of reference positions of the rotation of an engine (i.e., cycle or period between predetermined fixed angles) is measured and the next prescribed cycle or period is estimated or predicted based on the current cycle or period thus measured.

Figure 13:
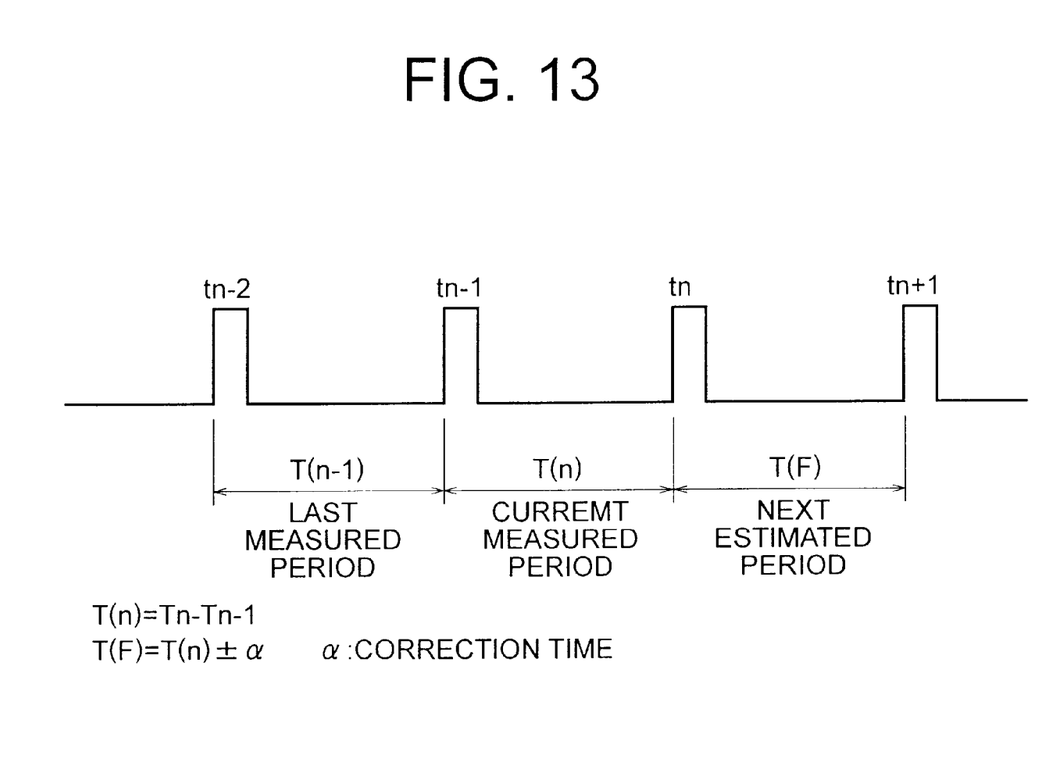
FIG. 13 is a view explaining a cycle prediction method for predicting or estimating the next cycle in known timing control of ignition timing and fuel injection timing.

FIG. 13 is an explanatory view illustrating the cycle prediction method. First of all, a reference signal is generated by a reference signal generator at each timing, for instance, at time points tn-2, tn-1 and tn, respectively, as shown in FIG. 13. Here, assuming tn as the current timing (time), a current measured cycle T(n) can be calculated as follows: T(n)=tn−tn-1. Then, the next estimated or predicted cycle T(F) is calculated as follows: T(F)=T(n)±α, where α is a correction factor to be described later. Based on these measured and estimated cycles, a variety of kinds of timing control operations are carried out.

Figure 14:
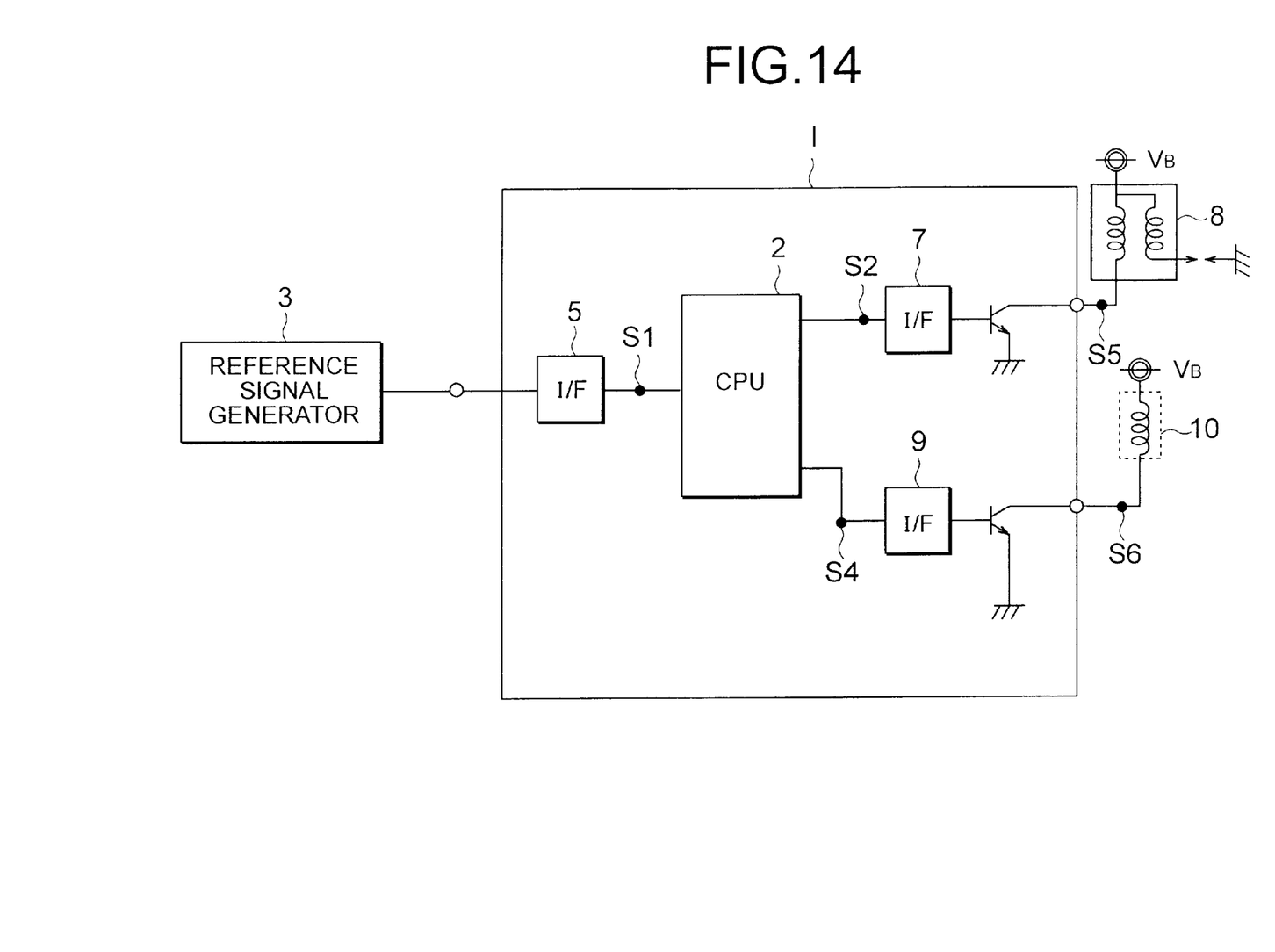
FIG. 14 is a view illustrating the construction of this kind of known control system for an internal combustion engine.

FIG. 14 illustrates the configuration of such a kind of known control system for an internal combustion engine. In FIG. 14, the known control system includes an internal combustion engine control unit (ECU) 1, a reference signal generator 3, an ignition (IG) coil 8 and a fuel injector 10. The ECU 1 includes a CPU 2 acting as an arithmetic processing section, a reference signal input I/F circuit 5, an IG coil drive I/F circuit 7 connected with the ignition (IG) coil 8, and an injector drive I/F circuit 9 connected with the fuel injector 10.

Figure 15:
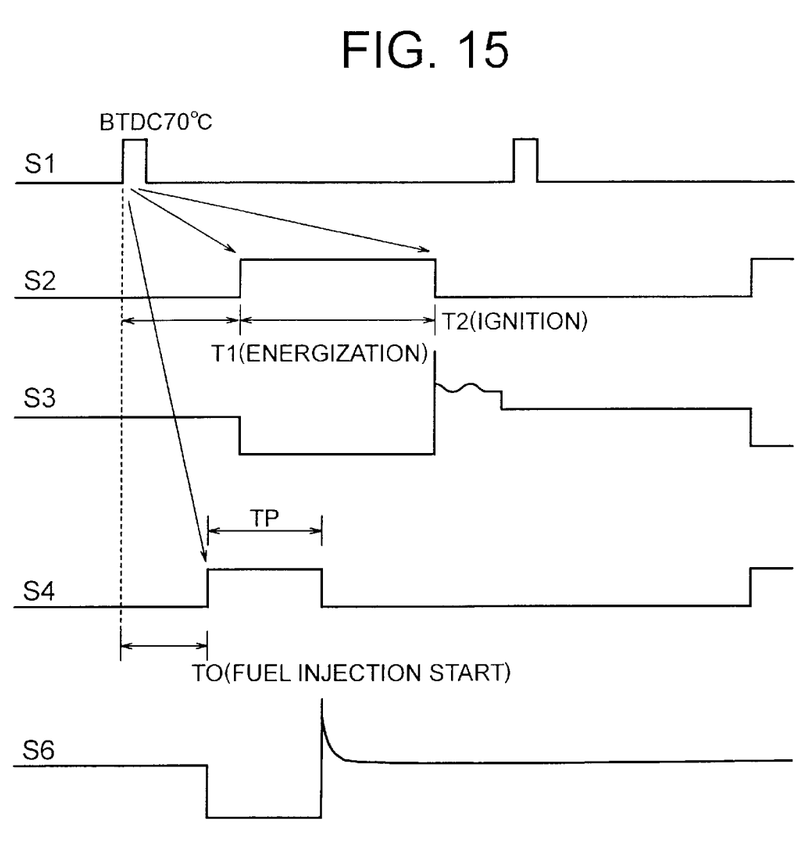
FIG. 15 is a view illustrating a time chart of signals in respective portions of the system of FIG. 14.

FIG. 15 illustrates a time chart of signals at respective portions of the system of FIG. 14.

Now, reference will be made to the operation of the known control system for an internal combustion engine while referring to FIGS. 14 and 15. A signal is generated by the reference signal generator 3 at predetermined timing, so that reference timing is input to the CPU 2 in the ECU 1 via the reference signal input I/F circuit 5. When this reference timing is input to the CPU 2, a reference signal interrupt is generated in the processing of the CPU 2, whereby the CPU 2 performs processing of the ignition timing, the fuel injection timing and the fuel injection amount for a cylinder which has generated the current interrupt.

For instance, the CPU 2 sets an energization start timing T1 and an ignition (cut-of timing T2 (see a signal S2 for these timing) for the IG coil 8 to a prescribed timer. Also, the CPU sets a fuel injection start timing T0 (see a signal S4) to another prescribed timer. When each timer with these timing set therein counts a predetermined period of time (time duration), an interrupt is generated to perform output processing so that output signals are sent from these timers to the corresponding drive I/F circuits 7, 9, respectively.

As shown in FIG. 15 for example, with an interrupt of the IG coil energization start timing T1, the output S2 of the CPU 2 to the IG coil drive I/F circuit 7 is switched from a low (L) level to a high (H) level, whereas at the IG coil ignition (cut-off) timing T2, the output S2 is switched from the H level to the L level, thereby causing the IG coil 8 to generate an ignition output.

At the fuel injection start timing T0, an output S4 of the CPU 2 to the injector drive I/F circuit 9 is switched from the L level to the H level, and at the same time a pulse width (time duration) TP corresponding to an amount of injection is set to a prescribed timer whereby a predetermined amount of fuel can be supplied from the injector 10.

In the case of this cycle prediction method, the accuracy of the next prediction cycle becomes an important parameter for control. That is, if the prediction cycle or period is inaccurate, there will be errors or deviations in the ignition timing and the fuel injection timing, thus giving rise to a possibility of adversely affecting the driving and operation of an associated internal combustion engine.

At present, in order to improve the accuracy of the above-mentioned cycle prediction, various corrections are carried out for engine operating conditions (e.g., the prediction cycle is set to be shorter during acceleration, and longer during deceleration), or the intervals between pulses of the reference signal are shortened to absorb and make it possible to detect variations in rotation of the engine for improved accuracy.

In the above circumstances, the above-mentioned ignition timing and the fuel injection timing are important items for engine output power and its stability in internal combustion engines, and hence high accuracy is demanded for these important items. Particularly, in the system of a direct-injection method in which fuel is injected directly into engine cylinders, accuracy in fuel injection timing is required to be higher than before, and hence is becoming an even more important item. In addition, in the case of two-cycle engines, variations in the number of revolutions per minute of the engine are great due to engine structures, and hence, there arises a problem that an accurate cycle prediction is difficult.

SUMMARY OF THE INVENTION

The present invention is intended to obviate the problem as referred to above, and has for its object to provide a control system for an internal combustion engine which is capable of controlling ignition timing and fuel injection timing in a stable manner at any time even in an engine, or in an operating range or in an operating condition, in which there are great variations in the number of revolutions per minute of the engine.

Bearing the above object in mind, the present invention resides in a control system for an internal combustion engine, including: a reference signal generator for generating a reference signal representative of a reference position of the rotation of the engine; a fixed angle signal generator for generating a fixed angle signal which has a resolution higher than that of the reference signal and which is representative of a rotational position of the engine; and an internal combustion engine control unit with an arithmetic processing section operable to receive the reference signal and the fixed angle signal and control ignition timing and fuel injection timing based on a count value of the fixed angle signal with the reference signal taken as a reference, the internal combustion engine control unit being also operable to control a fuel injection amount by a time measurement.

In a preferred form of the present invention, the internal combustion engine control unit includes a storage section for storing a table including crank angles representative of engine rotational positions of the ignition timing and the fuel injection timing and a fuel injection time representative of the fuel injection amount for determining ideal ignition timing, ideal fuel injection timing and an ideal fuel injection amount in each engine operating condition. The arithmetic processing section comprises counters for counting the fixed angle signal up to set values of the crank angles, respectively, which are set in accordance with the table so as to control the ignition timing and the fuel injection timing, and a timer for measuring time up to a set value of a time which is set in accordance with the table so as to control the fuel injection amount.

In another preferred form of the present invention, the fixed angle signal generator includes a ring gear operable to rotate in synchronization with the rotation of the engine, and a rotation sensor for detecting a tooth of the ring gear and generating the corresponding fixed angle signal. The internal combustion engine control unit includes a fixed angle signal I/F circuit for generating four pulses from one tooth of the ring gear based on the fixed angle signal from the rotation sensor.

In a further preferred form of the present invention, the fixed angle signal I/F circuit includes a full-wave rectifier circuit for full-wave rectifying the fixed angle signal from the rotation sensor to generate a full-wave rectified signal, a regular interval pulse shaping circuit for slicing the full-wave rectified signal at a predetermined voltage level to generate a pulse signal of a ½ duty ratio, and a pulse circuit for generating a pulse every time the pulse signal output from the regular interval pulse shaping circuit rises or falls.

In the present invention, a control system for an internal combustion engine includes a reference signal generator for generating a reference signal of the engine, a fixed angle signal generator for generating a fixed angle (high resolution) signal of the engine, and an internal combustion engine control unit (ECU) with a CPU acting as an arithmetic processing section for generating drive signals to an ignition (IG) coil and a fuel injector based on the reference signal and the fixed angle signal thereby to control ignition timing, fuel injection timing and a fuel injection amount.

By angle counting using the reference signal and the fixed angle signal, the CPU controls the ignition timing, which includes an energization start time point and an ignition time point for the IG coil, and the fuel injection timing (drive timing), which is a fuel injection start time point of the fuel injector. Also, the CPU controls the fuel injection amount (drive time) by using a timer (time) in the CPU. As a result, it becomes possible to stably control the ignition timing, the fuel injection timing and the fuel injection amount at any time even in an engine, or in an operating range, or in an operating condition, in which variations in the number of revolutions per minute of the engine are great.

In addition, the ECU further includes an input I/F circuit for the fixed angle signal which serves to improve the resolution of the fixed angle signal to be input thereto.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
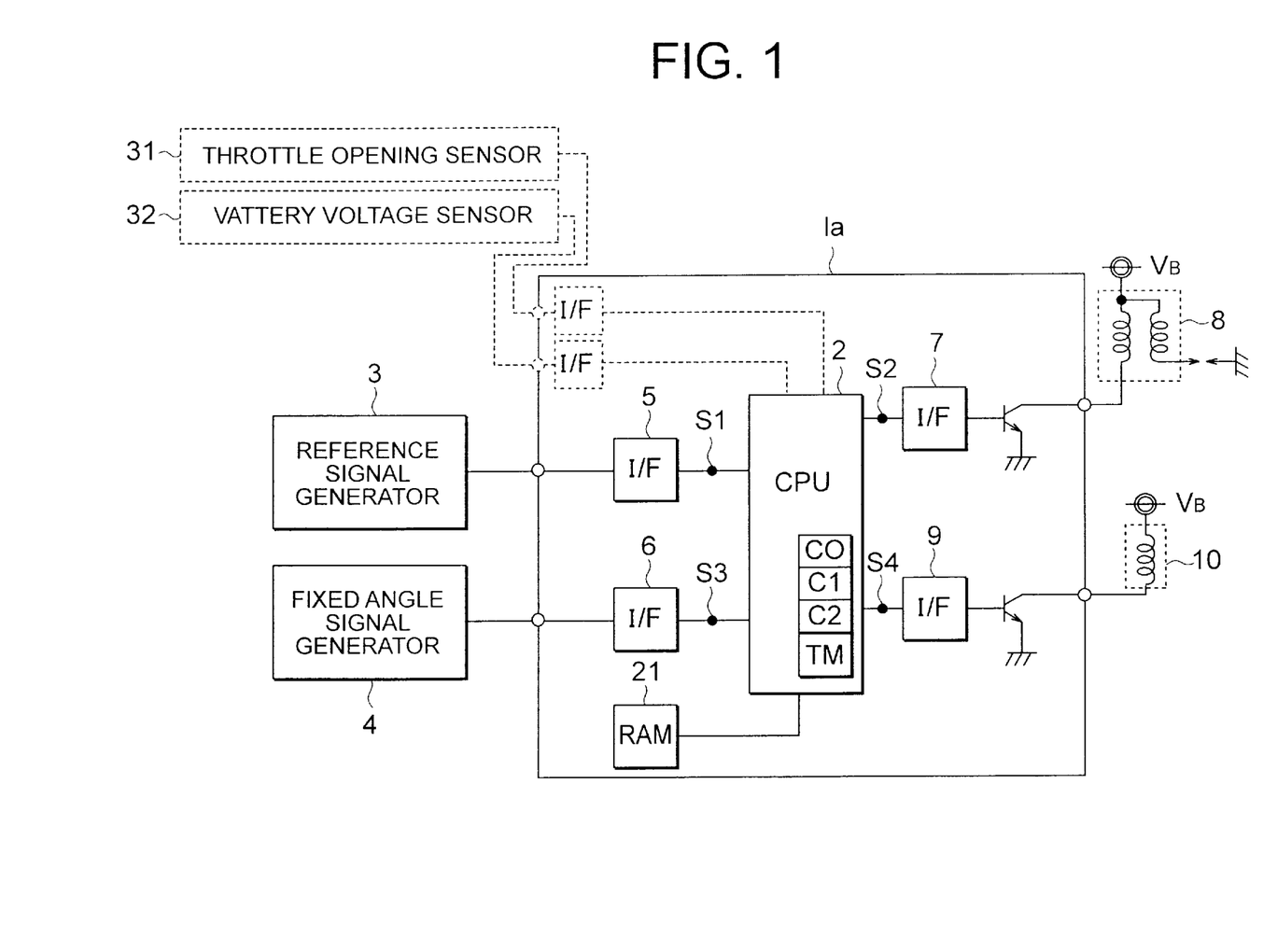
FIG. 1 is a view illustrating the construction of a control system for an internal combustion engine according to one embodiment of the present invention.

FIG. 1 illustrates the construction of a control system for an internal combustion engine according to one embodiment of the present invention. In this figure, the same or corresponding parts as those of the above-mentioned known control system for an internal combustion engine are identified by the same symbols. The control system of this embodiment includes an internal combustion engine control unit (ECU) 1a with a CPU 2 acting as an arithmetic processing section incorporated therein, a reference signal generator 3 for generating a reference signal representative of a reference position of the rotation of the engine, and a fixed angle signal generator 4 for generating a fixed angle signal representative of a rotational position of the engine with a resolution higher than that of the reference signal. The ECU 1a includes a reference signal input I/F circuit 5, a fixed angle signal input I/F circuit 6, an IG coil drive I/F circuit 7 connected with IG coils 8 (only one is illustrated), and an injector drive I/F circuit 9 connected with fuel injectors 10 (only one is illustrated). The ECU 1a further includes a RAM 21 for temporarily storing data, and counters C0, C1, C2 and a timer TM all of which may be constituted by software in the CPU 2 for example. In addition, a reference numeral 31 designates a throttle opening sensor, and a reference numeral 32 designates a battery voltage sensor.

Figure 2:
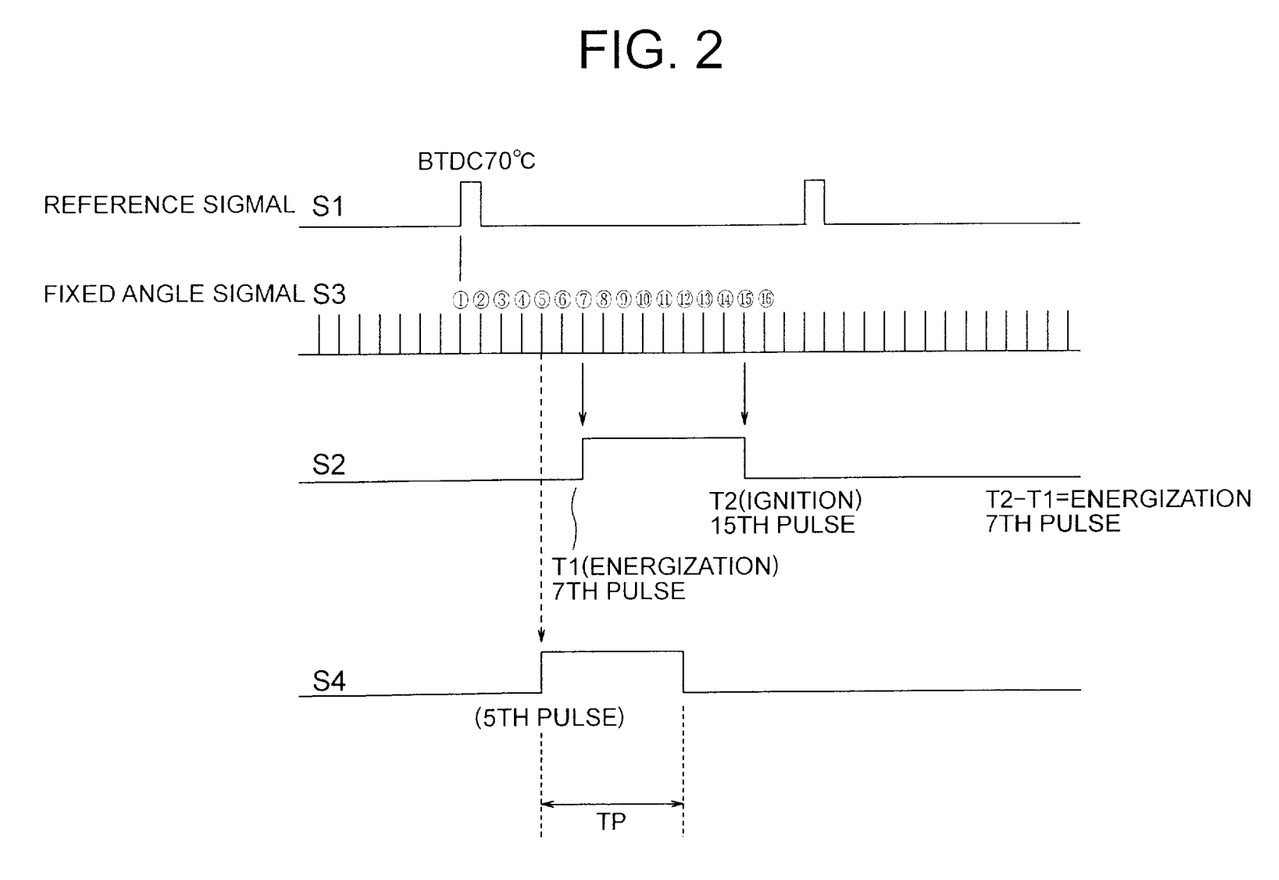
FIG. 2 is a time chart of signals in respective portions of the system of FIG. 1.
Figure 3:
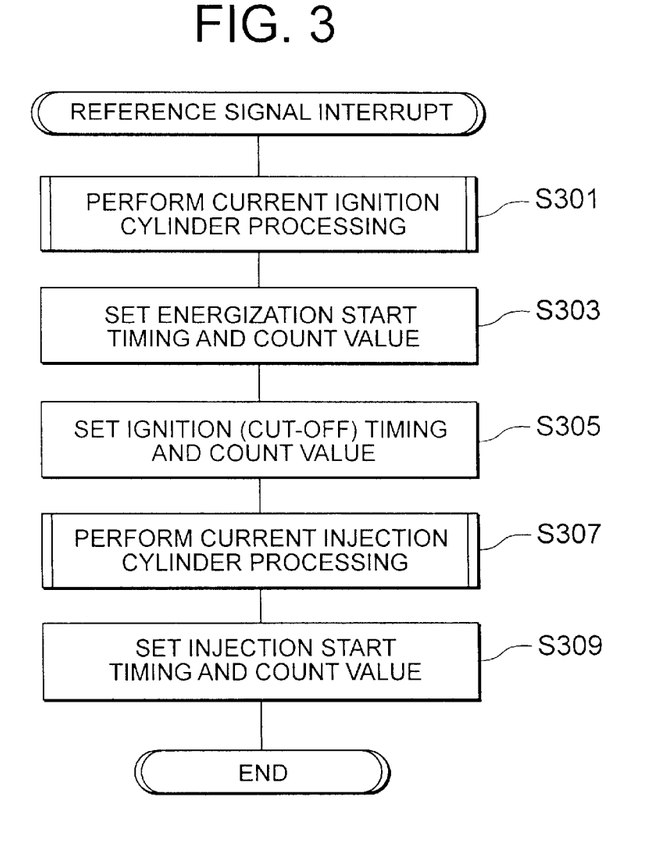
FIG. 3 is a flow chart illustrating the operation of a CPU of FIG. 1.

FIG. 2 illustrates a time chart of signals in respective portions of the system of FIG. 1, and FIGS. 3 through 6 are flow charts which illustrate the operation of the CPU 2.

In the present invention, using the reference signal generator 3 and the fixed angle signal generator 4 (a predetermined resolution signal of the crank angle, for instance, resolution of 1° crank angle (CA)), the timing control on the energization start and the ignition (cut-off) of each IG coil 8 and the timing control on the fuel injection start of each fuel injector 10 are performed by an angle counting method according to the counters C0, C1, C2 of the CPU 2, and at the same time the fuel injection amount (injector drive period) is controlled by the timer TM (time) of the CPU 2, whereby it becomes possible to control the ignition timing, the fuel injection timing and the fuel injection amount in a stable manner at any time even in an engine in which variations in the number of revolutions per minute of the engine are great, or in an operating range or in an operating condition of the engine in which variations in the number of revolutions per minute of the engine are great.

The operation of this embodiment will now be described below according to FIGS. 1 through 6. A reference signal S1 and a fixed angle signal S3 are input to the CPU 2, and the CPU 2 counts the fixed angle signal S3 by means of the counters C0, C1, C2 based on the reference signal S1.

When there takes place an interrupt corresponding to the reference timing of each cylinder of the reference signal S1 (FIG. 3), a current cylinder (for instance, cylinder #1) is checked and the ignition cylinder processing corresponding to the current cylinder is carried out (step S301). First of all, an angle from the current interrupt angle (corresponding to the reference signal S1 indicated at BTDC 70° in FIG. 2) to an angle corresponding to the energization start timing T1, at which energization of the current controlled cylinder (for example, cylinder #1) is started, and an angle from the current interrupt angle to the ignition or cut-off timing T2, at which ignition or cut-off of the current controlled cylinder (for instance, cylinder #1) is effected, are calculated for ignition timing control, and these angles thus calculated are then converted into count values corresponding to the fixed angle signal S3.

In the RAM 21, there is in advance stored a table representing crank angles $KA1_{T0}$, $KB1_{T0}$, . . . , $KA1_{T2}$, $KB1_{T2}$, . . . from the reference signal S1 to the ideal fuel injection start time point T0 and the ideal ignition time point T2, respectively, In respective operating conditions and ideal fuel injection times or durations TPA1, TPB1, . . . for respective cylinders. The operating conditions are determined by the numbers of revolutions per minute of the engine $EC_A$, $EC_B$, . . . obtained from the reference signal S1 or by throttle openings $TH_A$, $TH_B$, . . . obtained from the throttle opening sensor 31. The determination of the cylinders is made based on the reference signal S1.

Figure 7:
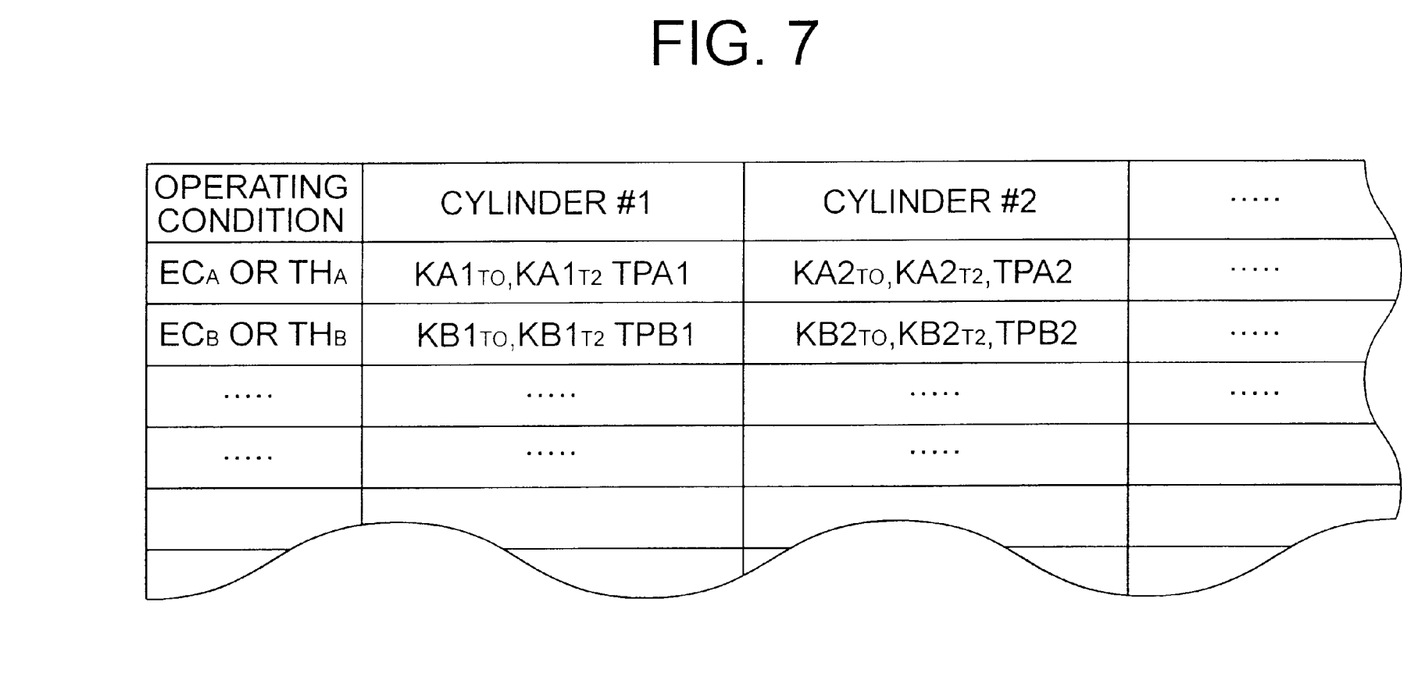
FIG. 7 is a view illustrating one example of a table which represents ideal settings for controlling ignition timing, fuel injection timing and a fuel injection amount in respective operating conditions, used for control of the present invention and stored in a RAM of FIG. 1.

The CPU 2 calculates crank angles K from the reference signal S1 to the ideal fuel injection time point T0 and the ideal ignition time point T2 and an ideal fuel injection time point TP based on an operating condition determined by the number of revolutions per minute of the engine EC or the throttle opening TH while looking up the table shown in FIG. 7.

When th reference signal S1 is at a crank angle of 70° and an ideal crank angle from the reference signal S1 to the ignition time point T2 is 15°, as illustrated in FIG. 2, the ideal crank angle will be a 15th pulse if one pulse of the fixed angle signal S3 represents a crank angle of 1°.

Figure 8:
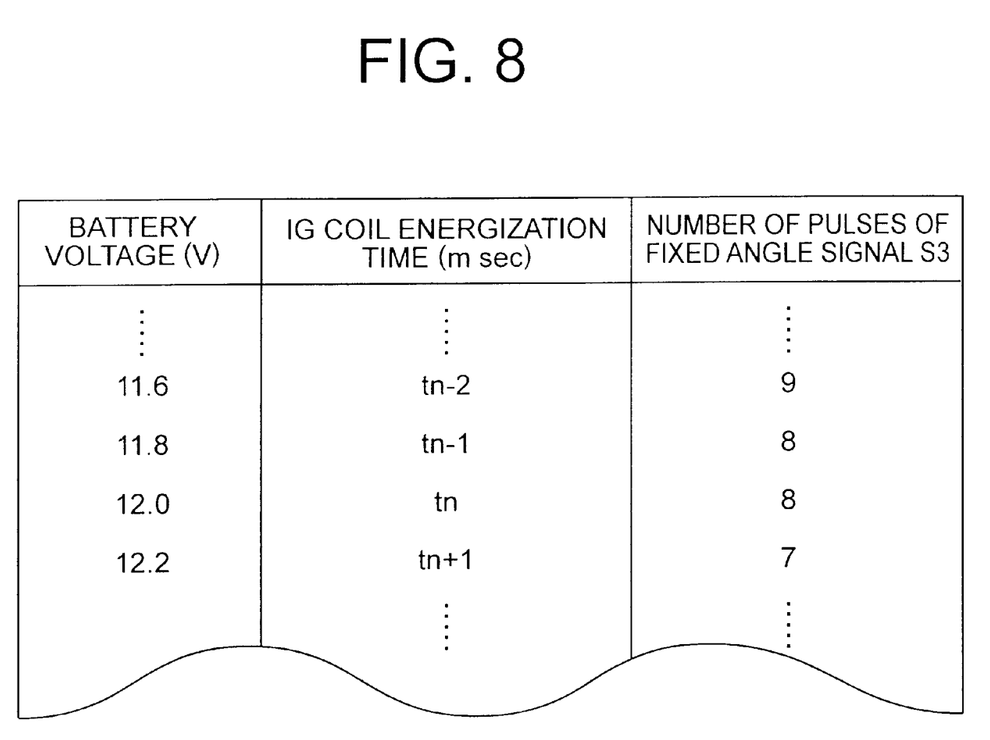
FIG. 8 is a view illustrating one example of a table which represents ideal settings of an IG coil energization time and the number of fixed angle signal pulses with respect to the battery voltage, used for control of the present invention and stored in a RAM of FIG. 1.

Moreover, in order to enable the CPU 2 to calculate the ideal energization start time point T1 to each IG coil 8 from the ignition time point T2, further stored in advance in the RAM 21 is a table, for example as shown in FIG. 8, which represents an energization time t to each IG coil 8 or the number of fixed angle signal pulses m corresponding to the energization time t with respect to the changing battery voltage $V_B$.

The CPU 2 calculates, from the table shown in FIG. 8, the ideal energization time t to each IG coil 8 based on the battery voltage obtained from the battery voltage sensor 32, and converts it into the corresponding number of fixed angle signal pulses, or it calculates the number of fixed angle signal pulses corresponding to the ideal energization time t directly from the battery voltage.

In the case shown in FIG. 2, for example, the battery voltage is 12 V, and the energization time is tn, or the number of fixed angle signal pulses corresponding to this energization time tn is 8. Therefore, the energization start time point T1 becomes a 7th (=15−8) pulse.

Then, the energization start timing count value (e.g., 7 in the example of FIG. 2) is set to the counter C1 which controls the energization start timing, and the counter C1 is started to count (step S303). Similarly, the ignition (cut-off) timing count value (e.g., 15 in the example of FIG. 2) is set to the counter C2 which controls ignition (cut-off) timing, and the counter C2 is started to count (step S305). At this time, the cylinder number (No.) corresponding to the timing count values currently set to the respective counters is set to a predetermined position in the RAM 21 with a flag.

Subsequently, the injection cylinder processing corresponding to the current cylinder is carried out (step S307). For fuel injection control, the ideal fuel injection start timing T0 (e.g., 5th pulse in the example of FIG. 2) is determined based on the table illustrated in FIG. 7 in the same manner as described above, and a fuel injection start timing count value (e.g., 5 in the example of FIG. 2) is set to the counter C0, and the counter C0 is started to count. In addition, other necessary control operations (though a description thereof is omitted since these control operations do not relate particularly to the present invention) are performed, and the reference signal interrupt processing is completed (step S309).

Figure 4:
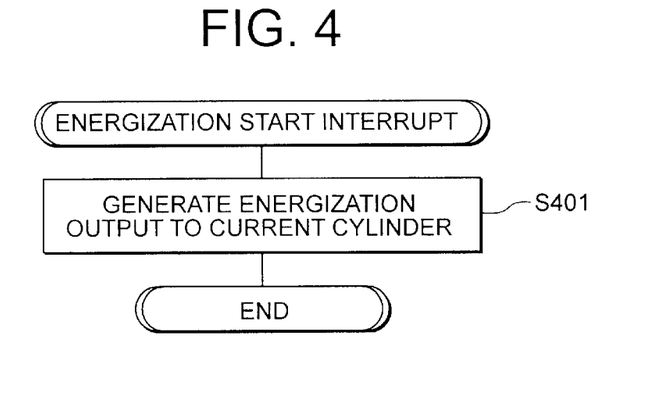
FIG. 4 is a flow chart illustrating the operation of the CPU of FIG. 1.
Figure 5:
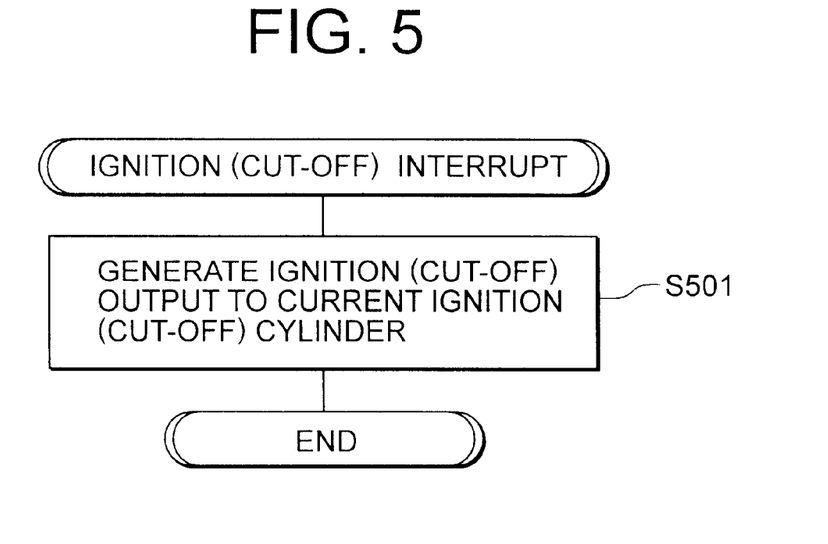
FIG. 5 is a flow chart illustrating the operation of the CPU of FIG. 1.
Figure 6:
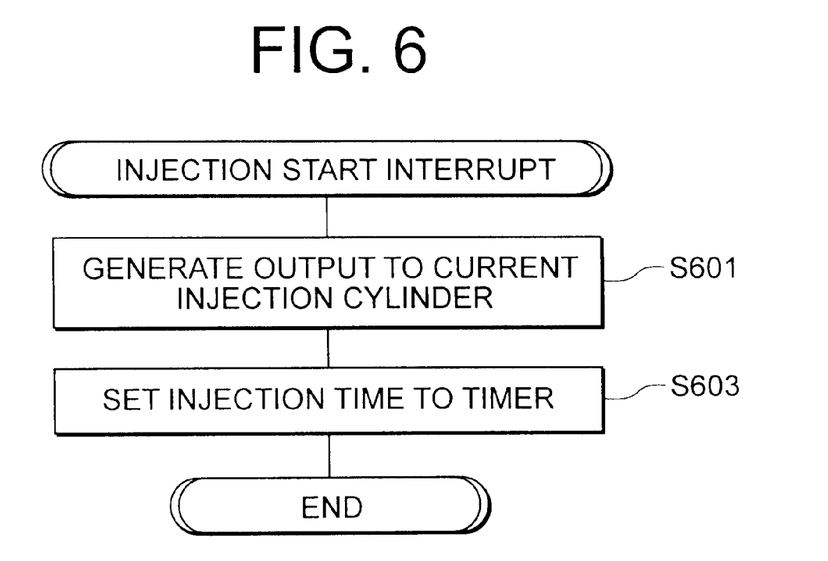
FIG. 6 is a flow chart illustrating the operation of the CPU of FIG. 1.

Thereafter, when the respective counters C0 through C2, counting only up to their set values, reach their set values, respectively, there take place corresponding interrupts as shown in FIGS. 4 through 6, respectively. In case of the counters C1, C2 related to ignition timing, which cylinder the current interrupt corresponds to is checked based on the content of the flag at the predetermined position in the RAM 21, and the drive output processing to the IG coil 8 of the corresponding cylinder is performed.

Specifically, in cases where the count value of the energization start counter C1 reaches the set value and generates an interrupt (FIG. 4), a cylinder to which the current energization is to be started is confirmed and checked by the content of the flag in the RAM, and an energization start output is generated to the predetermined cylinder, that is, the signal S2 is switched from the L level to the H level (step S401).

In cases where the count value of the ignition (cut-off) counter C2 reaches the set value and generates an interrupt (FIG. 5), a cylinder to which the current ignition (cut-off) is to be performed is confirmed and checked by the content of the flag in the RAM, and an ignition (cut-off) output is generated to the predetermined cylinder, that is, the signal S2 is switched from the H level to the L level (step S501).

Also, in the case of the counter C0 related to fuel injection start, when the count value of the counter C0 reaches the set value and generates an interrupt (FIG. 6), a drive output is similarly generated to the fuel injector 10 of a corresponding cylinder, that is, the signal S4 is switched from the L level to the H level) (step S601), and then a fuel injection time TP (injector drive time) corresponding to a fuel injection amount for the corresponding cylinder is determined from the table shown in FIG. 7 as described above, and set to the timer TM, which is then driven to start counting (step S603).

Here, when the timer TM, measuring the fuel injection time TP thus set, reaches the set value, the drive output to the injector 10 is stopped, that is, the signal S4 is switched from the H level to the L level).

In this manner, the ignition timing and the fuel injection timing are controlled in accordance with the crank angle counting method, so that accurate control on the ignition timing and the fuel injection timing can be effected even in cases where variations in rotation of the engine are great at the time of idling, acceleration, deceleration, etc. In addition, accuracy in the fuel injection amount also becomes stable by accurately controlling the ignition timing and the fuel injection timing.

Here, it is to be noted that in this system, it is constructed such that every time an interrupt of each counter or timer is generated, a count value or a timer set value corresponding to the next cylinder to be subsequently processed and the corresponding cylinder are set whereby even in the event that abnormality (a break in signal lines, etc.) occurs in the reference signal S1 in the course of transmission thereof, it becomes possible to continue controlling the ignition timing and the fuel injection timing in a stable manner as long as the fixed angle signal S3 is normal.

Embodiment 2.

Figure 9:
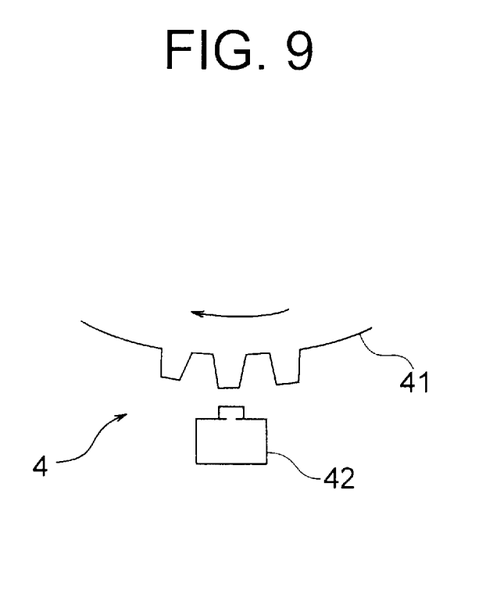
FIG. 9 is a view illustrating one example of the construction of a fixed angle signal generator in a control system for an internal combustion engine according to another embodiment of the present invention.

Next, the fixed angle signal generator 4 for generating the fixed angle signal S3 in the form of a high resolution signal (crank angle signal) may be constructed such that the teeth of a ring gear 41, which is usually used for starting an engine by means of a starter and which is arranged around the crank shaft (not shown in particular) of the engine so as to be rotated in synchronization therewith, is detected by a rotation sensor 42 in the form of an electromagnetic sensor for example, as shown in FIG. 9. With such a construction, it is possible to produce the fixed angle signal generator by using existing component parts of the engine control system in a simple and easy manner.

Here, it should be noted that the number of teeth of the ring gear is generally small, and hence if signal pulses are generated directly corresponding to the number of teeth, there is a limitation to the resolution of the signal thus generated, that is, it is impossible to obtain a high resolution signal and improve the control accuracy as well. However, it is possible to improve the resolution of the signal detecting the teeth of the ring gear by means of the input I/F circuit of the ECU 1a.

Figure 10:
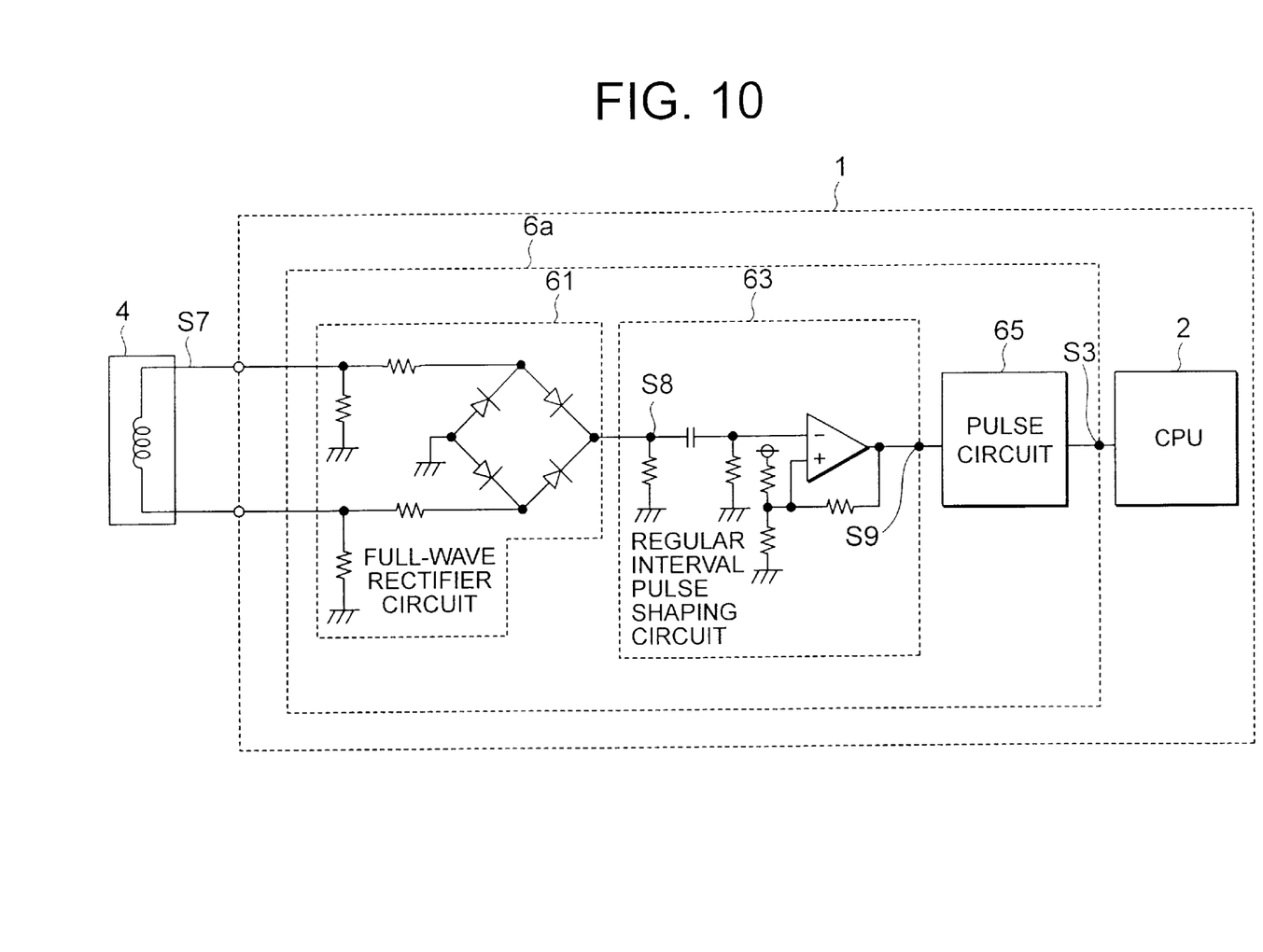
FIG. 10 is a view particularly illustrating one example of the construction of a fixed angle signal input I/F circuit of a control system for an internal combustion engine according to a further embodiment of the present invention.
Figure 11:
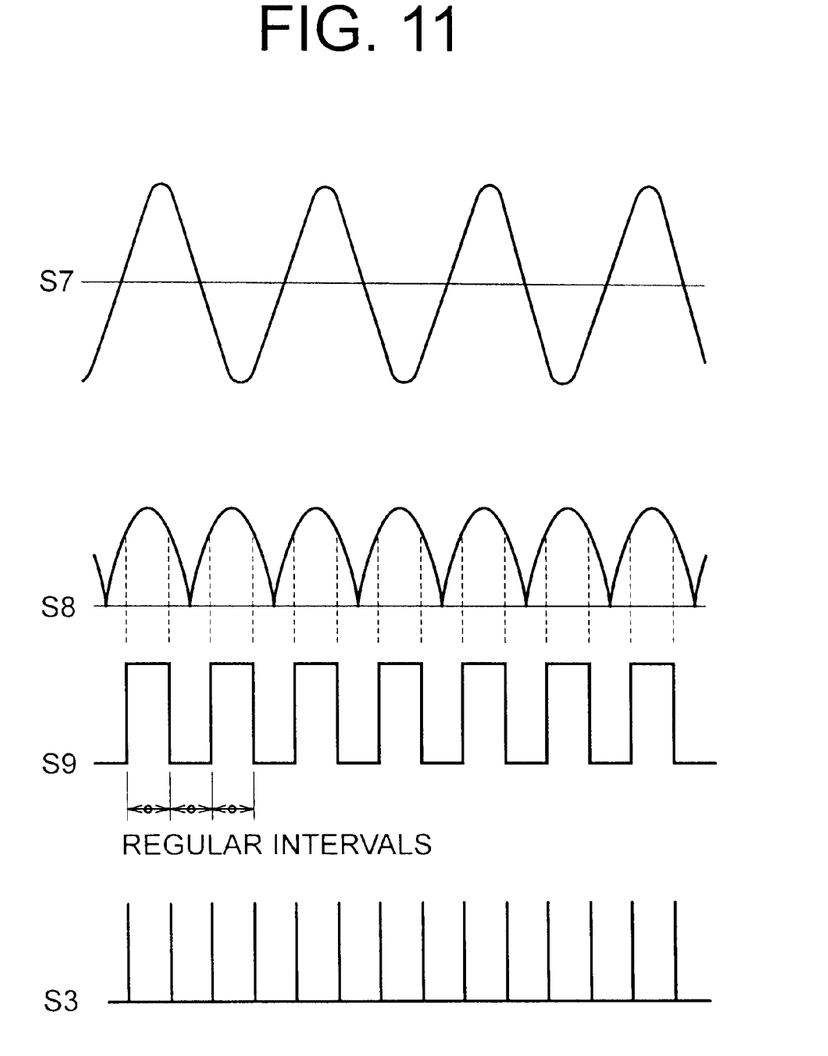
FIG. 11 is a time chart of signals in respective portions of the system of FIG. 10.

FIG. 10 particularly illustrates one example of the configuration of a fixed angle signal input I/F circuit of a control system for an internal combustion engine according to another embodiment of the present invention in which four pulses of regular or equal intervals can be generated for one tooth of a ring gear. FIG. 11 illustrates a time chart of signals in respective portions of the system of FIG. 10.

In this figure, the same or corresponding parts as those of the above-mentioned embodiment are identified by the same symbols. A fixed angle signal input I/F circuit 6a, to which a fixed angle signal S7 is input from a fixed angle signal generator 4 (shown as a coil of the rotation sensor 42) of such a construction as illustrated in FIG. 9, includes a full-wave rectifier 61 for full-wave rectifying the fixed angle signal S7 from the rotation sensor 42 into a signal S8, a regular interval pulse shaping circuit 63 for slicing the full-wave rectified signal S8 so as to generate a pulse signal S9 of a ½ duty ratio, and a pulse circuit 65 for generating pulses at a rising edge and a falling edge, respectively, of each output pulse of the regular interval pulse shaping circuit 63. The full-wave rectifier 61 includes a full-wave rectifier bridge circuit, and the regular interval pulse shaping circuit 63 includes a differential amplifier for generating an output based on the magnitude of an input signal thereto relative to the reference signal.

The rotation sensor 42 is arranged in opposition to the teeth of the ring gear 41 as illustrated in FIG. 9. Here, assuming an electromagnetic sensor as an example of the rotation sensor 42, a fixed angle signal S7 is input to the fixed angle signal input I/F circuit 6a of FIG. 10. Then, the fixed angle signal S7 (sine wave) is waveform shaped by the full-wave rectifier 61 into a full-wave rectified signal S8 which is then sliced at a predetermined voltage level by the regular interval pulse shaping circuit 63 to provide a signal S9. Based on this signal 9, it is possible to generate four pulses (reference signal) S3 from one tooth of the ring gear 41 by way of the pulse circuit 65.

Figure 12:
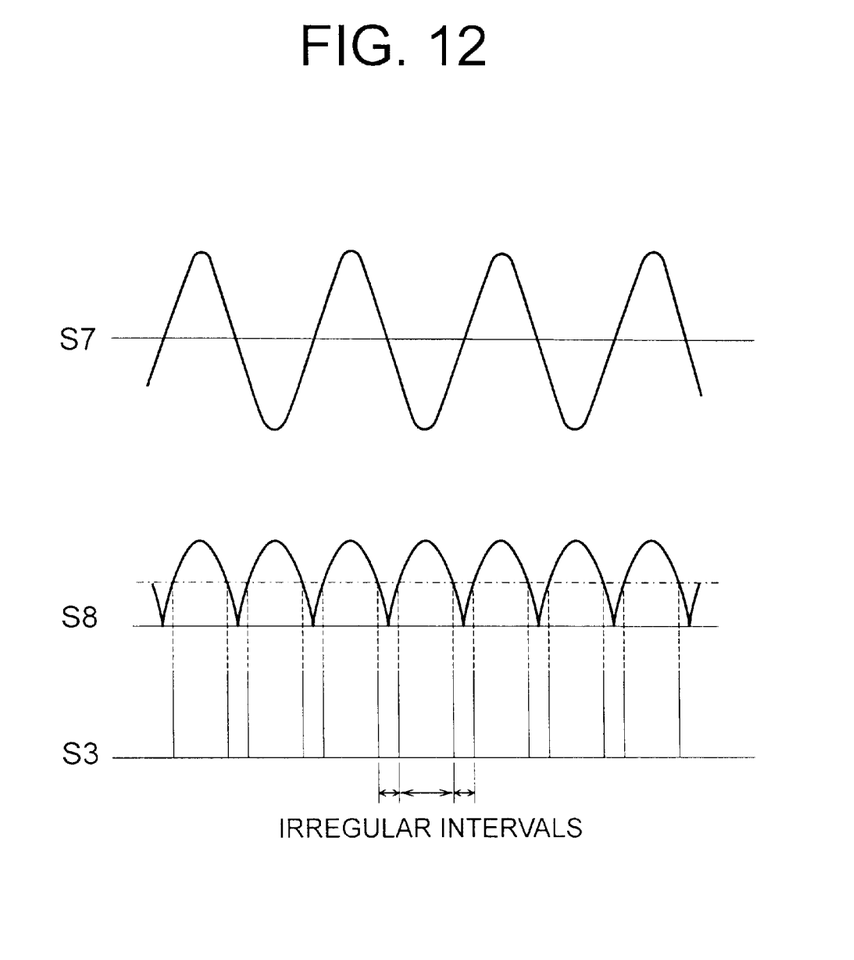
FIG. 12 is a view explaining regular interval pulse generation in the present invention.

Here, note that in cases where the signal S7 of the sine wave from the rotation sensor 42 is first full-wave rectified by the full-wave rectifier 61 and then waveform shaped at a predetermined slicing voltage by the regular interval pulse shaping circuit 63, the resultant signal S3 thus formed has irregular or unequal intervals between pulses, as illustrated in FIG. 12, and hence if the ignition timing and the fuel injection start timing are controlled based on this signal, it is impossible to perform accurate control on the ignition timing and the fuel injection timing.

Thus, in order to cope with this problem, the waveform shaping slicing voltage of the full-wave rectified signal S8 of the sine wave signal S7 (i.e., reference voltage applied to a positive input of the differential amplifier of the regular interval pulse shaping circuit 63) is varied in accordance with the waveform of the signal S7 or S8 or the number of revolutions per minute of the engine (determined from the reference signal), etc., so as to make the intervals between pulses of the reference signal equal to one another. As a result, it is possible to improve the control function of the engine only by changing the configuration of the fixed angle signal input I/F circuit 6a without adding a fixed angle signal generator with a special function.

Here, note that the fixed angle signal S7 from the fixed angle signal generator 4, which is constituted by the ring gear 41 and the rotation sensor 42, is output from the crankshaft of the engine, and hence the angular accuracy of the signal is mechanically determined, thus making it possible to maintain stable accuracy and resolution at all times even when the number of revolutions per minute of the engine is changing.

In this manner, the fixed angle signal of quadruple accuracy (resolution) is obtained from the sine wave generated by the fixed angle signal generator by means of the fixed angle signal input I/F circuit as constructed above, so the control function can be improved without employing a fixed angle signal generator with a special function.

Moreover, the control system according to the present invention is particularly useful and effective for two-cycle direct-injection engine systems in which variations in the engine rotation are generally great and high control accuracy is required.

As described in the foregoing, the present invention provides the following excellent advantages.

According to the present invention, a control system for an internal combustion engine includes a reference signal generator for generating a reference signal representative of a reference position of the rotation of the engine, a fixed angle signal generator for generating a fixed angle signal which has a resolution higher than that of the reference signal and which is representative of a rotational position of the engine, and an internal combustion engine control unit with an arithmetic processing section operable to receive the reference signal and the fixed angle signal and control ignition timing and fuel injection timing based on a count value of the fixed angle signal with the reference signal taken as a reference, the internal combustion engine control unit being also operable to control a fuel injection amount by a time measurement. With this arrangement, by using the reference signal (low resolution) and the fixed angle signal (high resolution), it is possible to control the ignition timing and the fuel injection timing in a stable manner at any time even in an operating range or in an operating condition of the engine in which variations in the number of revolutions per minute of the engine are great.

Preferably, the internal combustion engine control unit includes a storage section for storing a table including crank angles representative of engine rotational positions of the ignition timing and the fuel injection timing and a fuel injection time representative of the fuel injection amount for determining ideal ignition timing, ideal fuel injection timing and an ideal fuel injection amount in each engine operating condition. The arithmetic processing section includes counters for counting the fixed angle signal up to set values of the crank angles, respectively, which are set in accordance with the table so as to control the ignition timing and the fuel injection timing, and a timer for measuring time up to a set value of a time which is set in accordance with the table so as to control the fuel injection amount. With this arrangement, by employing the counters and the timer in which the ideal control values are set, it is possible to control the ignition timing, the fuel injection timing and the fuel injection amount at any time even in an engine in which variations in the number of revolutions per minute of the engine are great, or in an operating range or in an operating condition in which variations in the number of revolutions per minute of the engine are great.

Preferably, the fixed angle signal generator includes a ring gear operable to rotate in synchronization with the rotation of the engine, and a rotation sensor for detecting a tooth of the ring gear and generating the corresponding fixed angle signal. The internal combustion engine control unit includes a fixed angle signal I/F circuit for generating four pulses from one tooth of the ring gear based on the fixed angle signal from the rotation sensor. Thus, it is possible to improve the control function without adding a fixed angle signal generator with a special function.

Preferably, the fixed angle signal I/F circuit includes a full-wave rectifier circuit for full-wave rectifying the fixed angle signal from the rotation sensor to generate a full-wave rectified signal, a regular interval pulse shaping circuit for slicing the full-wave rectified signal at a predetermined voltage level to generate a pulse signal of a ½ duty ratio, and a pulse circuit for generating a pulse every time the pulse signal output from the regular interval pulse shaping circuit rises or falls. Accordingly, it is possible to obtain the fixed angle signal of a higher resolution with a simple circuit structure.

While the invention has been described in terms of preferred embodiments, those skilled in the art will recognize that the invention can be practiced with modifications within the spirit and scope of the appended claims.

What is claimed is:

1. A control system for an internal combustion engine comprising: a reference signal generator for generating a reference signal representative of a reference position of the rotation of the engine; a fixed angle signal generator for generating a fixed angle signal which has a resolution higher than that of said reference signal and which is representative of a rotational position of the engine; and an internal combustion engine control unit with an arithmetic processing section operable to receive said reference signal and said fixed angle signal and control ignition timing and fuel injection timing based on a count value of said fixed angle signal with said reference signal taken as a reference, said internal combustion engine control unit being also operable to control a fuel injection amount by a time measurement.

2. The control system for an internal combustion engine according to claim 1, wherein said internal combustion engine control unit comprises a storage section for storing a table including crank angles representative of engine rotational positions of the ignition timing and the fuel injection timing and a fuel injection time representative of the fuel injection amount for determining ideal ignition timing, ideal fuel injection timing and an ideal fuel injection amount in each engine operating condition, and said arithmetic processing section comprises counters for counting said fixed angle signal up to set values of said crank angles, respectively, which are set in accordance with said table so as to control the ignition timing and the fuel injection timing, and a timer for measuring time up to a set value of a time which is set in accordance with said table so as to control the fuel injection amount.

3. The control system for an internal combustion engine according to claim 2, wherein said fixed angle signal generator comprises a ring gear operable to rotate in synchronization with the rotation of the engine, and a rotation sensor for detecting a tooth of said ring gear and generating said corresponding fixed angle signal, and said internal combustion engine control unit comprises a fixed angle signal I/F circuit for generating four pulses from one tooth of said ring gear based on said fixed angle signal from said rotation sensor.

4. The control system for an internal combustion engine according to claim 3, wherein said fixed angle signal I/F circuit comprises a full-wave rectifier circuit for full-wave rectifying said fixed angle signal from said rotation sensor to generate a full-wave rectified signal, a regular interval pulse shaping circuit for slicing said full-wave rectified signal at a predetermined voltage level to generate a pulse signal of a ½ duty ratio, and a pulse circuit for generating a pulse every time said pulse signal output from said regular interval pulse shaping circuit rises or falls.

* * * * *